(12) United States Patent
Brissette et al.

(10) Patent No.: US 6,571,903 B2
(45) Date of Patent: Jun. 3, 2003

(54) HEAVY DUTY TRUCK SUSPENSION WITH DRIVE AXLE

(75) Inventors: Ronald N. Brissette, Lake Orion, MI (US); James R. Hawkins, Madison, AL (US); Christopher S. Keeney, Troy, MI (US); Patrick Kurzeja, Walled Lake, MI (US); Christos T. Kyrtsos, Southfield, MI (US); Jack Darrin Oates, Fletcher, NC (US); Tom Sanko, Troy, MI (US)

(73) Assignee: Meritor Suspension Systems Company, Troy, MI (US)

( * ) Notice: Subject to any disclaimer, the term of this patent is extended or adjusted under 35 U.S.C. 154(b) by 0 days.

(21) Appl. No.: 09/858,965

(22) Filed: May 16, 2001

(65) Prior Publication Data

US 2002/0170767 A1 Nov. 21, 2002

(51) Int. Cl.$^7$ ............................................... B60K 17/00
(52) U.S. Cl. ............ 180/352; 280/124.16; 280/124.128
(58) Field of Search .................. 280/124.116, 124.128, 280/124.131, 124.163, 124.157; 180/349, 352, 375, 376, 378

(56) References Cited

U.S. PATENT DOCUMENTS

| | | | | |
|---|---|---|---|---|
| 3,704,671 A | * | 12/1972 | Horne et al. ................. | 104/242 |
| 4,309,045 A | * | 1/1982 | Raidel .................. | 280/124.116 |
| 4,445,707 A | * | 5/1984 | Raidel .................. | 280/124.116 |
| 4,792,148 A | * | 12/1988 | Hintz .................. | 280/124.116 |
| 4,900,057 A | * | 2/1990 | Raidel .................. | 280/124.116 |
| 5,133,575 A | * | 7/1992 | Zantinge et al. ....... | 280/124.106 |
| 5,230,528 A | * | 7/1993 | Van Raden et al. ... | 280/124.116 |
| 5,505,481 A | * | 4/1996 | VanDenberg et al. . | 280/124.157 |
| 5,775,458 A | * | 7/1998 | Salo ............................ | 180/22 |
| 6,042,131 A | * | 3/2000 | Bailey ......................... | 180/352 |
| 6,328,322 B1 | * | 12/2001 | Pierce .................. | 280/124.131 |

* cited by examiner

Primary Examiner—Paul N. Dickson
Assistant Examiner—Toan C. To
(74) Attorney, Agent, or Firm—Carlson, Gaskey & Olds

(57) ABSTRACT

A suspension for a heavy duty vehicle is provided that includes a frame. A lower linkage is supported by the frame at a first pivotal connection. A drive axle assembly is supported by a lower linkage at a second pivotal connection. The drive axle assembly includes an input shaft defining a pinion angle. An upper linkage interconnects the drive axle assembly and the frame at third and fourth pivotal connections, respectively. The upper linkage includes an adjustment member, such as a turnbuckle, for modifying the length of the upper linkage to obtain a predetermined pinion angle. In this manner, the pinion angle may be adjusted upon assembly of the suspension system. Furthermore, by permitting the drive axle assembly to pivotally move relative to the linkages, the pinion angle may be maintained during suspension movement.

9 Claims, 1 Drawing Sheet

HEAVY DUTY TRUCK SUSPENSION WITH DRIVE AXLE

BACKGROUND OF THE INVENTION

This invention relates to a suspension system for heavy duty trucks, and more particularly, the invention relates to a suspension system having a drive axle assembly.

Heavy duty trucks typically utilize a trailing arm suspension system having one suspension member or arm. In the case of drive axles, the drive axle is supported by a lower suspension member that is pivotally connected to the frame. The drive axle includes an input shaft that has a U-joint on the end for connection to a driveshaft. The input shaft and U-joint of the drive axle assembly has what is commonly referred to as a pinion angle, which is the angle of the centerline of the input shaft relative to a horizontal plane. The drive axle is typically rigidly connected to the suspension member and an air spring is arranged between the suspension member and the frame. As the suspension moves up and down during operation of the heavy duty vehicle, the pinion angle changes. Excessive pinion angle changes, which may occur during normal vehicle operation, may cause increased wear and undesirable operation of the U-joint.

Suspensions have been proposed for use with non-drive axle assemblies which have a lower arm and an upper arm spaced from the lower arm interconnecting the frame and the axle assembly. However, in the case of a drive axle assembly the upper or lower arm must be adjusted to obtain a desired pinion angle. Accordingly, what is needed is a suspension system for a drive axle assembly that permits the adjustment of the pinion angle and which maintains the pinion angle during suspension movement in the course of normal heavy duty vehicle operation.

SUMMARY OF THE INVENTION AND ADVANTAGES

The present invention provides a suspension for a heavy duty vehicle that includes a frame. A lower linkage is supported by the frame at a first pivotal connection. A drive axle assembly is supported by a lower linkage at a second pivotal connection. The drive axle assembly includes an input shaft defining a pinion angle. An upper linkage interconnects the drive axle assembly and the frame at third and fourth pivotal connections, respectively. The upper linkage includes an adjustment member, such as a turnbuckle, for modifying the length of the upper linkage to obtain a predetermined pinion angle. In this manner, the pinion angle may be adjusted upon assembly of the suspension system. Furthermore, by permitting the drive axle assembly to pivotally move relative to the linkages, the pinion angle may be maintained during suspension movement.

Accordingly, the above invention provides a suspension system which permits adjustment and maintains pinion angle.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
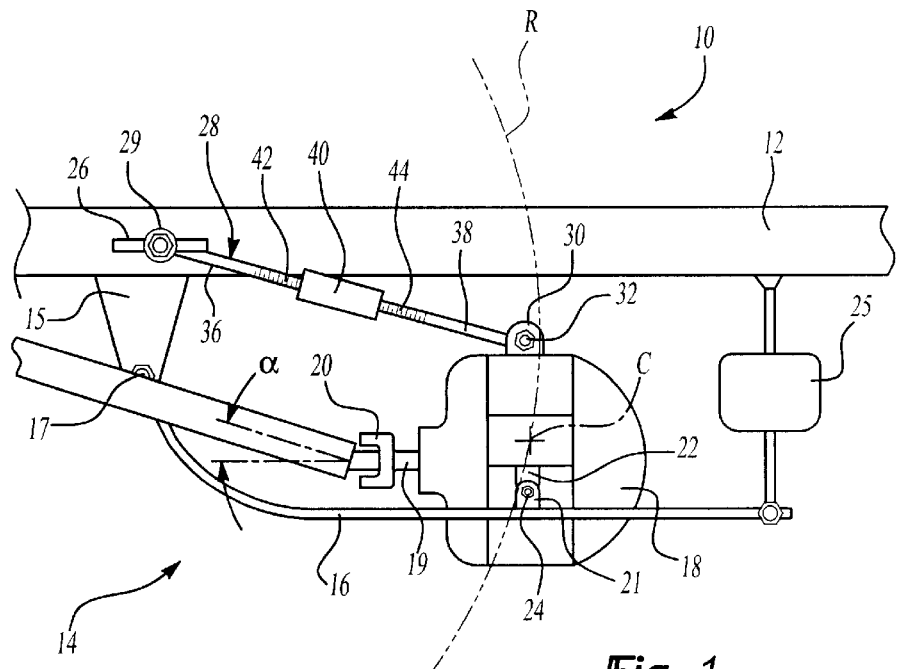
FIG. 1 is a schematic view of the suspension system of the present invention in a first position.
Figure 2:
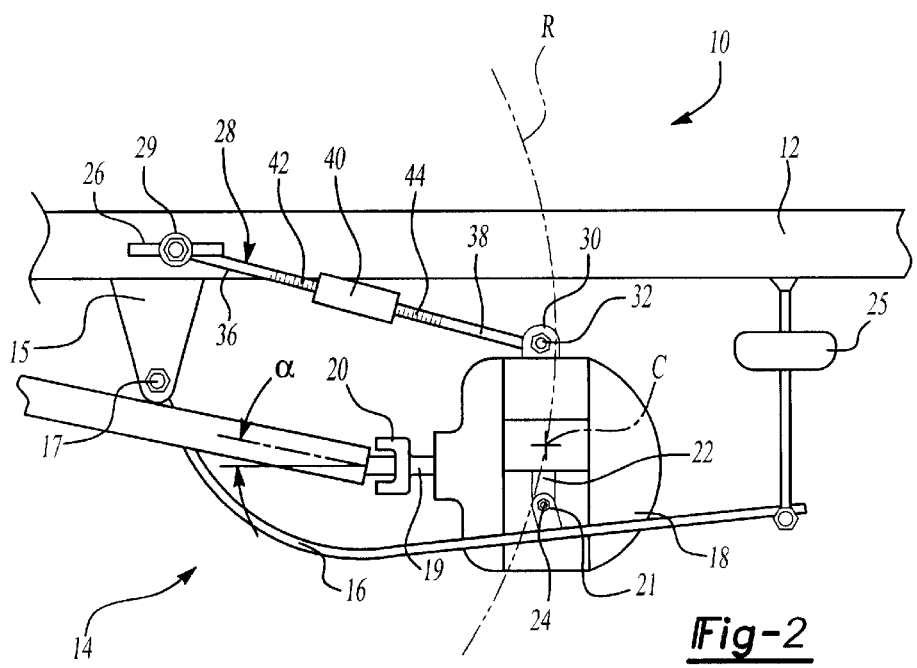
FIG. 2 is a schematic view of the suspension system of the present invention in a second position.

A suspension system 10 of a heavy duty vehicle is shown in FIGS. 1 and 2. The suspension system 10 includes a frame 12 and a suspension 14 which moves between a first position (shown in FIG. 1) and a second position (shown in FIG. 2). The frame 12 includes a lower support 15 and a lower linkage 16 secured to the lower support 15 at a pivotal connection 17. A drive axle assembly 18 is supported on the lower linkage 16 and includes an input shaft 19 and a U-joint 20 secured to an end thereof. The U-joint is connected to a driveshaft for receiving rotational drive from the driveshaft to drive the vehicle wheels about an axle centerline C. The drive axle assembly 18 has a pinion angle defined by the input shaft 19 and a horizontal plane. Of course, the pinion angle may be defined in some other way. Typically, it is desirable to maintain a particular pinion angle during the operation of the drive axle assembly 18. Preferably, the drive axle assembly 18 is supported on the lower linkage 16 by brackets 20 and 21 which define a lower pivotal connection 24, about which the drive axle assembly 18 is permitted to rotate relative to the lower linkage 16. An air spring 25 is arranged between the frame 12 and the lower linkage 16 to dampen the force during the movement of the suspension 14.

One end of an upper linkage 28 is secured to an upper support 26 at a pivotal connection 29. The other end of the upper linkage 28 is secured to the drive axle assembly 18 by a bracket 30, which defines an upper pivotal connection 32. The upper linkage 28 may include first 36 and second 38 portions having threaded ends 42 and 44. An adjustment member 40, such as a turnbuckle, secures the threaded ends 42 and 44 together. The linkages 16, 28 and the pivotal connections 17, 24, 29, 32 define the pinion angle by locating the drive axle assembly 18. Once the drive axle assembly 18 is installed, the pinion angle is set. However, the adjustment member 40 permits the upper linkage 28 to be lengthened or shortened thereby changing the pinion angle. That is, by lengthening the upper linkage 28 the pinion angle may be increased. Conversely, by shortening the upper linkage 28 the pinion angle may be lessened. By manipulating the adjustment member 40 the pinion angle may be adjusted upon initial assembly and during maintenance of the suspension 14. In the case of a turnbuckle, the adjustment member 40 is rotated in an appropriate direction to lengthen or shorten the upper linkage 28.

Furthermore, by utilizing a lower 16 and upper 28 linkage, the pinion angle may be maintained during movements of the suspension 14 between first and second positions. That is, during movement of the suspension 14 in a vertical direction during normal operation the pinion angle may be maintained. As the lower linkage 16 moves in an upward direction the upper linkage 28 causes the drive axle assembly 18 to rotate rearward relative to the lower linkage 16 to maintain the pinion angle. Of course, the length and spacing of the upper linkage 28 relative to the lower linkage 16 will impact whether and the degree to which the pinion angle is maintained during vertical movement of the suspension 14. Said another way, the pinion angle may change slightly depending upon the particular geometry of the lower 16 and upper 28 linkages of the suspension 14.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A suspension for a vehicle comprising:

a frame;

a lower linkage supported by said frame at a first pivotal connection;

a drive axle assembly supported by said lower linkage at a second pivotal connection, said drive axle assembly including an input shaft defining a pinion angle; and an upper linkage interconnecting said drive axle assembly and said frame at third and fourth pivotal connections, respectively, said upper linkage including an adjustment member for modifying the length of said upper linkage to obtain a predetermined pinion angle.

2. The suspension according to claim 1, wherein said upper linkage includes first and second portion interconnected by said adjustment member, and said adjustment member comprising a turnbuckle.

3. The suspension according to claim 1, further including an air spring interposed between said lower linkage and said frame.

4. The suspension according to claim 1, further including lower and upper brackets secured to said drive axle assembly, said upper and lower brackets defining said second and third pivotal connections, respectively.

5. The suspension according to claim 1, wherein said input shaft includes a U-joint on an end thereof for receiving rotational drive from a drive shaft.

6. The suspension member according to claim 2, wherein said adjustment member is rotated between first and second positions to respectively provide first and second upper linkage lengths defined by the distance between said third and fourth pivotal connections that are different than one another.

7. The suspension according to claim 1, wherein said upper and lower linkages are traverse to an axle centerline.

8. The suspension according to claim 1, wherein said suspension includes a pair of lower linkages and a pair of upper linkages.

9. The suspension according to claim 1, wherein said upper and lower linkages are arranged longitudinally relative to the vehical.

* * * * *

UNITED STATES PATENT AND TRADEMARK OFFICE
CERTIFICATE OF CORRECTION

PATENT NO.   : 6,571,903 B2
DATED        : June 3, 2003
INVENTOR(S)  : Brissette et al.

It is certified that error appears in the above-identified patent and that said Letters Patent is hereby corrected as shown below:

Column 4,
Line 22, "vehical" should be -- vehicle --.

Signed and Sealed this

Twenty-ninth Day of July, 2003

JAMES E. ROGAN
*Director of the United States Patent and Trademark Office*